US012392277B2

(12) United States Patent
Doura et al.

(10) Patent No.: US 12,392,277 B2
(45) Date of Patent: Aug. 19, 2025

(54) AMMONIA-BURNING COMBUSTION ENGINE

(71) Applicant: Johnson Matthey Public Limited Company, London (GB)

(72) Inventors: Kevin Doura, Audubon, PA (US); John Kilmartin, Sonning Common (GB); Jing Lu, Wayne, PA (US); Nicholas Mcnamara, Wayne, PA (US); Thomas Manning Yeh, Audubon, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 18/724,063

(22) PCT Filed: Feb. 17, 2023

(86) PCT No.: PCT/GB2023/050364
§ 371 (c)(1),
(2) Date: Jun. 25, 2024

(87) PCT Pub. No.: WO2023/156787
PCT Pub. Date: Aug. 24, 2023

(65) Prior Publication Data

US 2025/0067209 A1 Feb. 27, 2025

Related U.S. Application Data

(60) Provisional application No. 63/268,238, filed on Feb. 18, 2022.

(30) Foreign Application Priority Data

Apr. 14, 2022 (EP) .................................... 22168487

(51) Int. Cl.
*F02B 43/08* (2006.01)
*F02B 43/10* (2006.01)
(Continued)

(52) U.S. Cl.
CPC .............. *F02B 43/10* (2013.01); *F02B 77/02* (2013.01); *F02F 1/24* (2013.01); *F02F 3/14* (2013.01)

(58) Field of Classification Search
CPC .. F01N 3/2066; F01N 2610/02; B01J 21/063; B01J 35/19; F02D 19/0644; F02M 21/0206; F02M 27/02
(Continued)

(56) References Cited

U.S. PATENT DOCUMENTS 8,166,926 B2 5/2012 Sasaki et al.
9,249,720 B2 * 2/2016 Miyagawa .............. F02B 43/10
(Continued)

FOREIGN PATENT DOCUMENTS

JP 2006 052722 A 2/2006
JP 6 078056 B2 2/2017
(Continued)

*Primary Examiner* — Logan M Kraft
*Assistant Examiner* — James J Kim
(74) *Attorney, Agent, or Firm* — BakerHostetler

(57) ABSTRACT

An ammonia-burning combustion engine. In particular, the present invention relates to an internal combustion engine for the combustion of ammonia, the engine comprising one or more combustions chambers comprising an ammonia combustion catalyst. The invention further relates to a method for operating an internal combustion engine by the combustion of ammonia, the method comprising contacting ammonia with a heated ammonia combustion catalyst in a combustion chamber of the engine to combust the ammonia.

14 Claims, 3 Drawing Sheets

(51) Int. Cl.
*F02B 77/02* (2006.01)
*F02F 1/24* (2006.01)
*F02F 3/14* (2006.01)

(58) Field of Classification Search
USPC ............................................................... 123/3
See application file for complete search history.

(56) References Cited

U.S. PATENT DOCUMENTS

| | | | | |
|---|---|---|---|---|
| 11,542,878 | B2 * | 1/2023 | Heggen | F02B 19/108 |
| 2008/0308056 | A1 | 12/2008 | Schiltz et al. | |
| 2011/0283960 | A1 | 11/2011 | Hikazudani et al. | |
| 2017/0157593 | A1 * | 6/2017 | Chorkendorff | B01J 23/10 |
| 2019/0070596 | A1 * | 3/2019 | Yang | B01J 23/745 |
| 2023/0349334 | A1 * | 11/2023 | Heaton | F02D 19/0644 |

FOREIGN PATENT DOCUMENTS

| | | | | |
|---|---|---|---|---|
| WO | 95/27845 | A1 | 10/1995 | |
| WO | WO-2013172141 | A1 * | 11/2013 | F02B 19/12 |

* cited by examiner

AMMONIA-BURNING COMBUSTION ENGINE

The present invention relates to an ammonia-burning combustion engine and, in particular, to an engine which contains an ammonia catalyst to overcome deficiencies in known ammonia-combustion engines.

While hydrogen ($H_2$) has been proposed for use as an alternative fuel for internal combustion engines, ammonia ($NH_3$) is also currently receiving an increased interest as a potential renewable carbon-free energy carrier. It is both considered as a fuel for direct use in a combustion system or fuel cell, or as an efficient hydrogen carrier (17.8% hydrogen content by mass) when it is decomposed.

Anhydrous ammonia ($NH_3$) stores and handles very much like liquefied petroleum gas (LPG). For example, ammonia has a boiling temperature of about −33.5° C. at 1.013 bar (1 atmosphere). Similarly, propane, the main constituent of (LPG) has a boiling temperature of about −42.1° C. Furthermore, ammonia is carbon free and renewable in addition to being reasonably practical to handle, store and transport.

Also, from an energy density standpoint, ammonia is much better than even liquefied hydrogen. On a volume basis, the energy density of liquefied hydrogen is about 8,491 KJ/liter compared to liquefied ammonia having an energy density of about 11,308 KJ/liter. As indicated by its chemical formula, $NH_3$, ammonia is one (1) part nitrogen and three (3) parts hydrogen. By atomic weight, ammonia is fourteen (14) parts nitrogen to three (3) parts hydrogen, or approximately 82% nitrogen to 18% hydrogen. However, while ammonia is only 18% hydrogen, the fact that there are 3 hydrogen atoms attached to a single nitrogen atom allows ammonia to contain significantly more hydrogen by volume than even liquefied hydrogen.

U.S. Pat. No. 8,166,926 describes an internal combustion engine with ammonia fuel. In particular, it discloses a method which comprises producing exhaust gas from the internal combustion engine and heating the ammonia with the exhaust gas to provide the ammonia at a selected temperature and pressure. This helps to facilitate the operation of the combustion engine. However, the application is silent on the treatment of gaseous components of the exhaust gases.

One problem with ammonia is flame propagation. Ammonia has a minimum ignition energy of about 680 mJ. By contrast, hydrogen has a minimum ignition energy of about 0.011 to 0.017 mJ and gasoline has a minimum ignition energy of 0.8 mJ. Consequently, the flame propagation speed of ammonia/air mixture is slow and it is difficult to realize high cycle efficiency because of the long combustion duration. A solution to this problem is to use a fuel which comprises both ammonia and hydrogen.

US20080308056 describes a hydrogen and ammonia fueled internal combustion engine. In particular, it provides a dual fuel system controlled by an electronic control system to adjust as desired the proportion of hydrogen and ammonia being used to fuel the engine. In a preferred mode of operation, the engine is started using a mixture rich in the catalyst fuel and then the proportion of ammonia is adjusted for preferred operation. This application is focuses on adjusting the engine conditions to target zero emissions, rather than focusing on the exhaust gas products produced by the engine.

Accordingly, it is an object of the present invention to provide an ammonia-combusting engine with improved performance, or at least to tackle problems associated therewith in the prior art, or provide a commercially viable alternative thereto.

According to a first aspect there is provided an internal combustion engine for the combustion of ammonia, the engine comprising one or more combustions chambers comprising an ammonia combustion catalyst.

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous. It is intended that the features disclosed in relation to the product may be combined with those disclosed in relation to the method and vice versa.

The present invention relates to an internal combustion engine (ICE) for the combustion of ammonia. An internal combustion engine is a broad and commonplace term in the art. It refers to a heat engine in which the combustion of a fuel occurs with an oxidizer (usually air) in a combustion chamber. In an internal combustion engine, the expansion of the high-temperature and high-pressure gases produced by combustion applies direct force to some component of the engine. The force is applied typically to pistons, turbine blades, a rotor, or a nozzle. This force moves the component over a distance, transforming chemical energy into useful kinetic energy and is used to propel, move or power whatever the engine is attached to.

ICE can broadly be divided into two categories: reciprocating engines such as 4-stroke engines, and combustion turbines, such as jet engines. Wankel engines strictly fall into neither category but are considered to fall into the former category for the purpose of this description.

A reciprocating engine typically comprises a number of complementary pistons arranged in separate cylinders and sharing a common crankshaft. Each piston is arranged at a different stage of a cycle to ensure that at least one is providing a driving power for the other pistons in the engine. This means that a piston driven down by the production of hot exhaust gases can drive the introduction of gases or the compression of gases in another cylinder at a different part of the cycle. A classic four stroke engine configuration is shown in FIG. 1.

Combustion turbines compress air and use it to turn a turbine or to use the body of hot air directly to provide thrust. There are three stages to a turbine: 1) air is drawn through a compressor where the temperature rises due to compression, 2) fuel is added in the combustor, and 3) hot air is exhausted through turbine blades which rotate a shaft connected to the compressor. A schematic of such a turbine is shown in FIG. 2.

The engine comprises one or more combustions chambers comprising an ammonia combustion catalyst. By a combustion chamber it is meant a volume provided with an inlet for air and an inlet for ammonia (albeit that in some engines the ammonia and air can be premixed before introduction), in which the ammonia is to be combusted, and an outlet for the exhaust gases.

The inventors have found that by providing such a catalyst in the combustion chamber it is possible to address a number of short-comings of ammonia combustion. In particular, they have found that they can lower the light-off temperature of the ammonia and/or increase the effective combustion speed. This can reduce the need for including other fuel components, such as hydrogen, mixed in with the ammonia.

Preferably the ammonia combustion catalyst comprises one or more metal oxides, preferably one or more selected from the group consisting of $Ag_2O$, $MnO_2$, $Co_3O_4$, CuO, $V_2O_5$, $Fe_2O_3$, $Pr_6O_{11}$, $RuO_2$ and NiO. Copper oxides are especially preferred.

The combustion catalyst may be provided as a film. This is advantageous because films can be provided as coatings on existing engine parts and are resistant to damage during the long lifetime of the operating engine part. The provision of films is known and the specific techniques required will depend on the metal oxide catalyst being applied.

The combustion catalyst may be provided as an extruded porous substrate. Alternatively, the combustion catalyst may be provided as a coating on a porous substrate. Preferably, when the catalyst is provided as an extruded or washcoated porous substrate, the porous substrate is a honeycomb monolith substrate. This will typically be a flow-through type substrate, since this facilitates the entry and exit of gases from the structure.

Suitable substrates may be composed of ceramic-like materials such as cordierite, α-alumina, silicon carbide, silicon nitride, zirconia, mullite, spodumene, alumina-silica-magnesia or zirconium silicate, or of porous, refractory metal. Preferred substrates are formed from cordierite and silicon carbide. Such materials are able to withstand the environment, particularly high temperatures, encountered.

The provision of catalysts having porous structures is commonplace in the automobile exhaust system field. This is because the high surface area of the support encourages contact between the gases to be treated and the catalytic material. This increases the benefits without requiring undue amounts of expensive catalytic material.

The catalyst material may be provided with a support material, such as alumina or titania. This is particularly the case when formulating a washcoat to include the catalyst material.

Titania may be preferred as catalyst support material due to its chemical stability. In particular, rutile and brookite may the preferred forms of titania for use as catalyst support material. Rutile may be a preferred for use as catalyst support material due to its good thermal stability especially at temperature of between about 600° C. to about 900° C. Alternatively, brookite may be preferred for use as catalyst support material due to its photocatalytic properties.

Alternatively, the support material may comprise a zeolite. Zeolites are preferred as the techniques necessary for the efficient distribution of catalyst material, such as CuO throughout are well known. When the support material comprises a zeolite, the zeolite may be a small-pore zeolite, a medium-pore zeolite or a large pore zeolite. Suitable zeolites may include CHA, AEI or BEA. A large pore zeolite may be advantageous since this may facilitate the rapid infiltration of ammonia into and out of the zeolite structure, such that it can contact the catalyst material. Large pore zeolites are those including 12-membered ring channels. Examples of suitable zeolites include FAU and Zeolite Y.

Preferably the engine is provided with a source of ammonia. This may be an ammonia storage vessel. The ammonia may be provided in a number of different forms and the type of storage required will depend on the form of ammonia provided. The ammonia may desirably be provided as a liquid or a gas and, in these instances, the most suitable storage vessel will be a high pressure cylinder. Alternatively, the ammonia may be provided as a solid, such as adsorbed onto a material, such as a metal halide, or covalently bonded within a metal complex. In these instances the storage requirements may differ. Suitable ammonia storage systems are well known in the art.

Preferably the engine is further provided with an exhaust gas treatment system. This system may comprise one or more catalyst articles for treating undesirable elements in the exhaust gas, such as NOx, $N_2O$ or slipped ammonia, or, where added, hydrogen. In this instance, the ammonia-combustion engine preferably has an exhaust manifold. A manifold is a conventional component for directing gases from multiple piston cylinders to a single exhaust system. The system comprises an exhaust system connected to the manifold for receiving the exhaust gas. The exhaust system comprises a flow path which extends from the manifold to an outlet to the atmosphere. Along the flow path the hot exhaust gases from the engine pass through one or more exhaust system catalyst articles or filters in order to treat undesirable components of the exhaust.

According to one embodiment, the internal combustion engine is a continuous combustion engine and the ammonia combustion catalyst is provided on one or more of a plurality of turbine blades, a turbine shaft and/or walls of the combustion chamber. It is generally preferred that the catalyst is provided on a stationary surface, such as the walls of the combustion chamber, rather than on a moving component, such as a turbine blade, since this enhances the longevity of the catalyst and minimises engine damage should a portion of the catalyst become loose. This is particularly the case since a change in mass of a rotating part can cause the engine to become unbalanced.

According to an alternative embodiment, the internal combustion engine is a reciprocating engine and each combustion chamber is a cylinder provided with a piston, wherein the ammonia combustion catalyst is provided on a piston crown and/or within a cylinder head. It is generally preferred that the catalyst is provided on a stationary surface, such as within the cylinder head, rather than on a moving component, such as a piston crown, since this enhances the longevity of the catalyst.

In a conventional reciprocating engine there are several different modes of operation which can be considered. Preferably the engine is configured to compress gases in the cylinder, to increase the temperature in the cylinder and to thereby heat-activate the ammonia combustion catalyst. In this approach the cylinder may further comprise means for providing an ignition spark. Typically, the cylinder comprises an inlet for air and an inlet for ammonia, or a combined air and ammonia inlet, and an outlet for exhaust gases.

According to a preferred embodiment, the ammonia-combustion catalyst is provided directly adjacent the inlet for ammonia. For example, the catalyst may be provided around the inlet for ammonia. This means that the catalyst can be away from the moving parts of the engine and ensures good direct contact with the injected ammonia. The same configuration can be adopted for continuous engines, whereby the catalyst is provided around an inlet for ammonia which introduces ammonia as a fuel into the combustion chamber.

According to a further aspect there is provided a method for operating an internal combustion engine by the combustion of ammonia, the method comprising contacting ammonia with a heated ammonia combustion catalyst in a combustion chamber of the engine to combust the ammonia and to thereby produce an increased gas pressure to drive a piston.

This method can either preferably operate whereby ammonia is introduced into the combustion chamber together with air and then compression-heated by a moving piston, and, optionally, ignited with a spark when compressed. Alternatively, the ammonia can be introduced into a combustion chamber containing compressed, compression-heated air. In either case, the presence of the ammonia combustion catalyst serves to reduce the temperature required for ignition of the ammonia and/or increases the speed of combustion, enhancing the performance of the ammonia as a catalyst.

FIGURES

The invention will now be described further in relation to the following non-limiting figures, in which.

Figure 1:
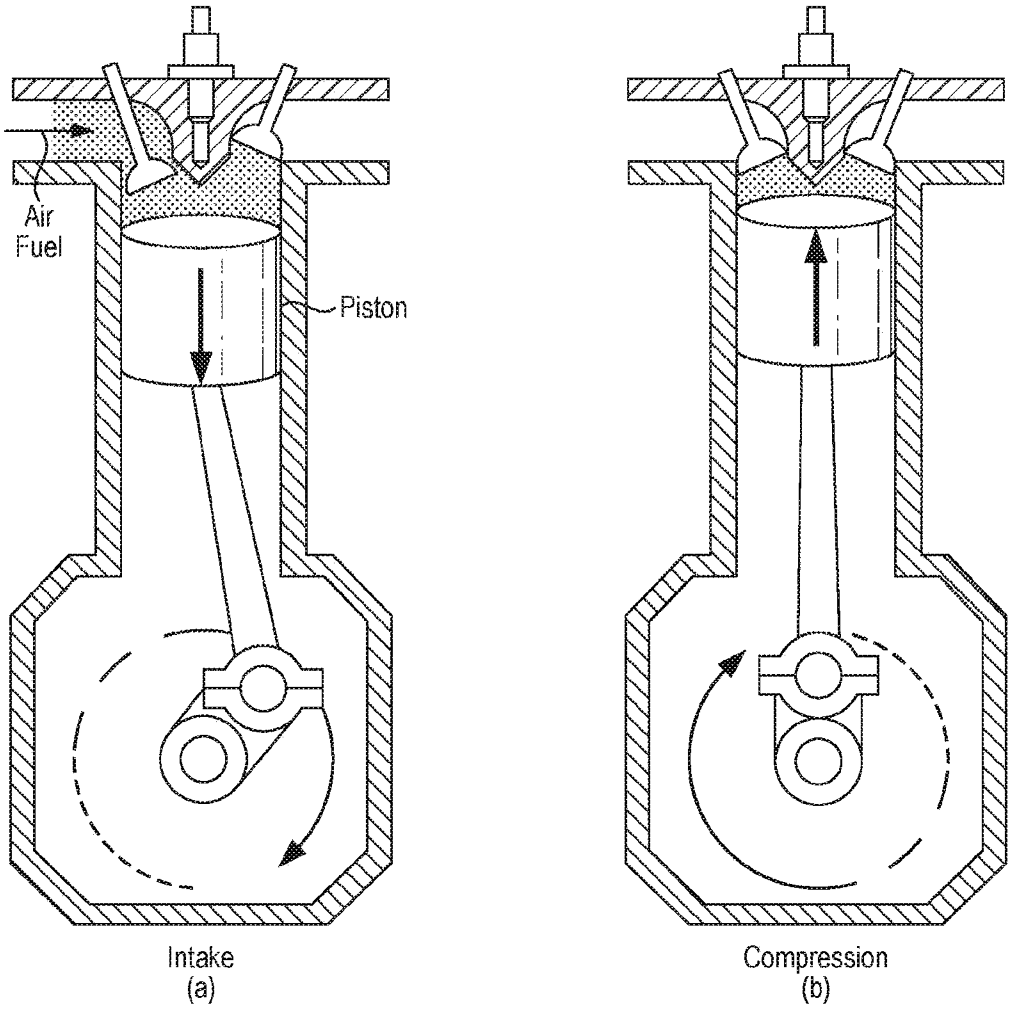
FIG. 1 shows a schematic of a conventional reciprocating engine configuration.
Figure 1:
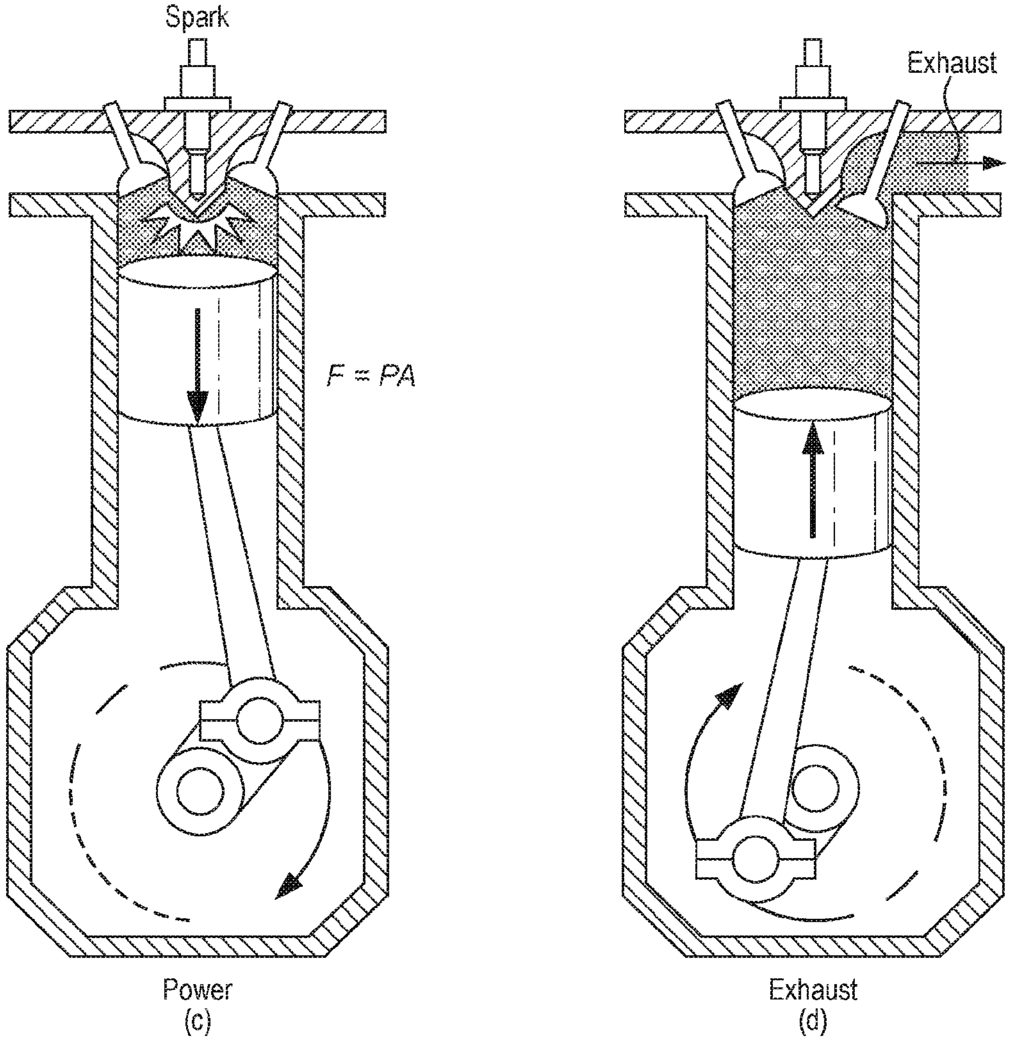
Figure 2:
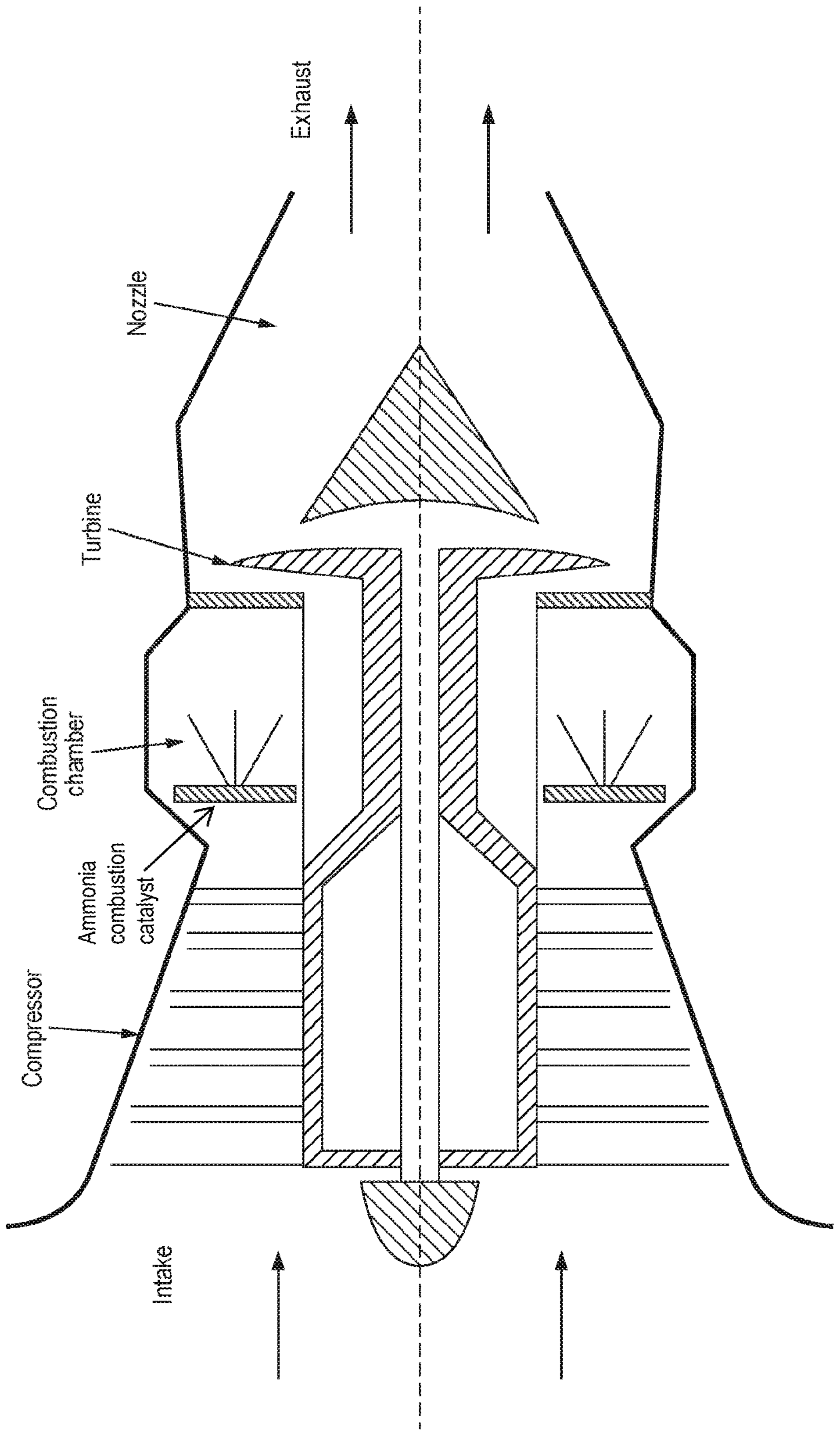
FIG. 2 shows a schematic of a gas turbine.

The term "comprising" as used herein can be exchanged for the definitions "consisting essentially of" or "consisting of". The term "comprising" is intended to mean that the named elements are essential, but other elements may be added and still form a construct within the scope of the claim. The term "consisting essentially of" limits the scope of a claim to the specified materials or steps and those that do not materially affect the basic and novel characteristic(s) of the claimed invention. The term "consisting of" closes the claim to the inclusion of materials other than those recited except for impurities ordinarily associated therewith.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

For the avoidance of doubt, the entire contents of all documents acknowledged herein are incorporated herein by reference.

The invention claimed is:

1. An internal combustion engine for the combustion of ammonia, the engine comprising one or more combustions chambers comprising an ammonia combustion catalyst, wherein the ammonia combustion catalyst is provided as a coating on a porous substrate, and the ammonia combustion catalyst is provided with a support material comprising titania or large pore zeolite.

2. The internal combustion engine according to claim 1, wherein the ammonia combustion catalyst comprises one or more metal oxides, preferably one or more selected from the group consisting of $Ag_2O$, $MnO_2$, $Co_3O_4$, CuO, $V_2O_5$, $Fe_2O_3$, $Pr_6O_{11}$, $RuO_2$ and NiO.

3. The internal combustion engine according to claim 1, wherein the porous substrate is a honeycomb monolith substrate.

4. The internal combustion engine according to claim 1, wherein the internal combustion engine is a continuous combustion engine and the ammonia combustion catalyst is provided on one or more of a plurality of turbine blades, a turbine shaft and/or walls of the combustion chamber.

5. The internal combustion engine according to claim 1, wherein the internal combustion engine is a reciprocating engine and each combustion chamber is a cylinder provided with a piston, wherein the ammonia combustion catalyst is provided on a piston crown and/or within a cylinder head.

6. The internal combustion engine according to claim 5, wherein the engine is configured to compress gases in the cylinder, to increase the temperature in the cylinder and to thereby heat-activate the ammonia combustion catalyst.

7. The internal combustion engine according to claim 6, wherein the cylinder further comprises means for providing an ignition spark.

8. The internal combustion engine according to claim 5, wherein the cylinder comprises an inlet for air and an inlet for ammonia, or a combined air and ammonia inlet, and an outlet for exhaust gases.

9. The internal combustion engine according to claim 8, wherein the ammonia combustion catalyst is provided around the ammonia inlet.

10. The internal combustion engine according to claim 1, wherein the ammonia combustion catalyst is provided with a support material comprising titania.

11. The internal combustion engine according to claim 10, wherein the titania comprises rutile and/or brookite.

12. A method for operating an internal combustion engine by the combustion of ammonia, the method comprising contacting ammonia with a heated ammonia combustion catalyst in a combustion chamber of the engine to combust the ammonia and to thereby produce an increased gas pressure to drive a piston, wherein the ammonia combustion catalyst is provided as a coating on a porous substrate, and the ammonia combustion catalyst is provided with a support material comprising titania or large pore zeolite.

13. The method according to claim 12, wherein ammonia is introduced into the combustion chamber together with air and then compression-heated by a moving piston, and, optionally, ignited with a spark when compressed.

14. The method according to claim 12, wherein ammonia is introduced into a combustion chamber containing compressed, compression-heated air.

* * * * *